United States Patent [19]

Trahan et al.

[11] Patent Number: 4,608,075

[45] Date of Patent: Aug. 26, 1986

[54] PLUNGER MECHANISM FOR USE IN A GLASSWARE FORMING MACHINE

[75] Inventors: Albert J. Trahan, Vernon, Conn.; Vladimir Vajda, Nussbaumen, Switzerland

[73] Assignee: Emhart Industries, Inc., Farmington, Conn.

[21] Appl. No.: 714,780

[22] Filed: Mar. 22, 1985

[30] Foreign Application Priority Data

Apr. 6, 1984 [GB] United Kingdom ............... 8408996

[51] Int. Cl.⁴ .............................................. C03B 11/06
[52] U.S. Cl. ...................................... 65/362; 65/172; 65/234
[58] Field of Search ................ 65/357, 359, 360, 362, 65/172, 173, 234

[56] References Cited

U.S. PATENT DOCUMENTS 2,379,830  7/1945  Samuelson et al. .................... 65/362
3,171,732  3/1965  Andersen ........................... 65/234 X
3,598,561  8/1971  Hamilton ........................... 65/173 X Primary Examiner—Arthur Kellogg
Attorney, Agent, or Firm—H. Samuel Kieser

[57] ABSTRACT

The plunger mechanism is for use in moving a plunger into or out of a mould cavity and has a piston movable in a cylinder with a piston rod projecting from the piston. A plunger can be mounted on the piston rod. A passage passes through the piston and the piston rod and communicates with a chamber in the plunger or with the mould cavity. A tube which can be connected to a source of air under pressure or to a vacuum source passes through the cylinder and enters the passage. The gap between the passage and the tube is sealed by an inwardly-contracting ring with an overlapping joint which makes sealing contact around the tube. A ring of resilient material may encircle the inwardly-contracting ring to seal the gap between the inwardly-contracting ring and the wall of a recess in which it is mounted.

4 Claims, 2 Drawing Figures

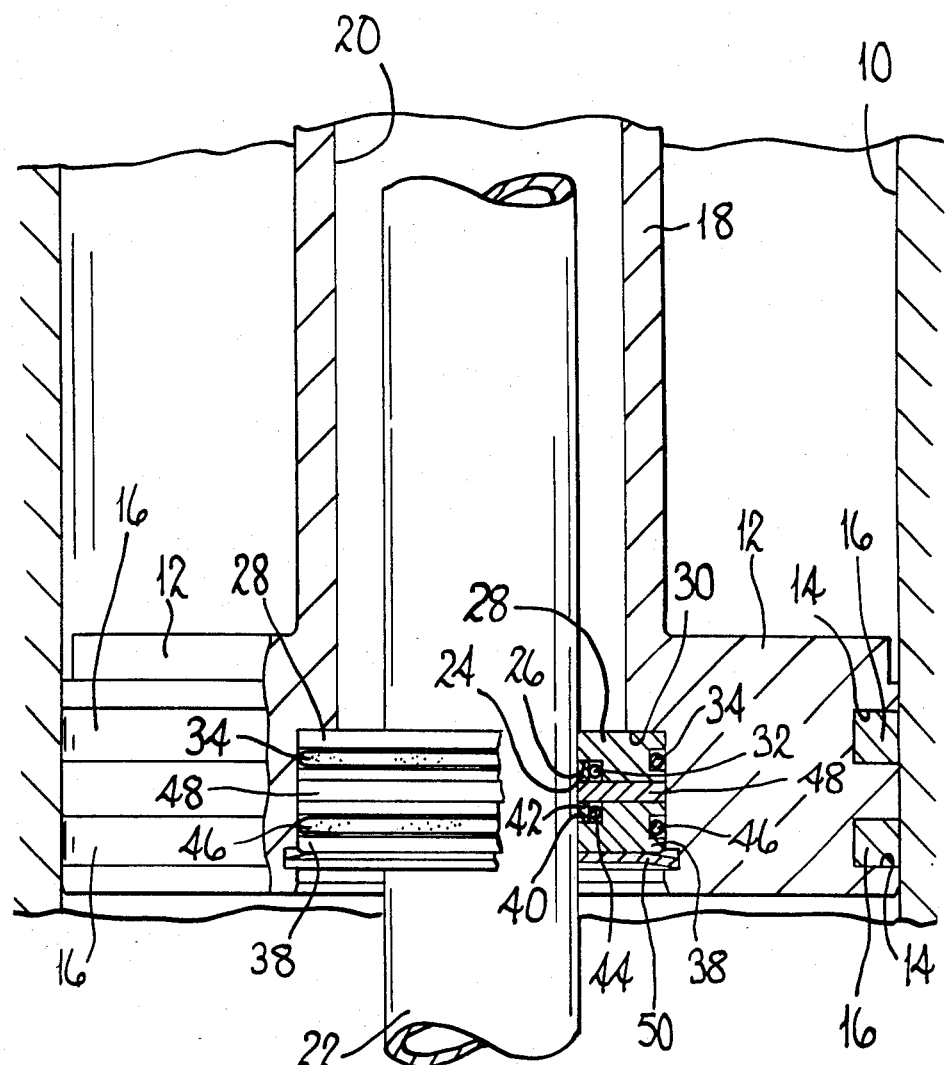
Fig_1
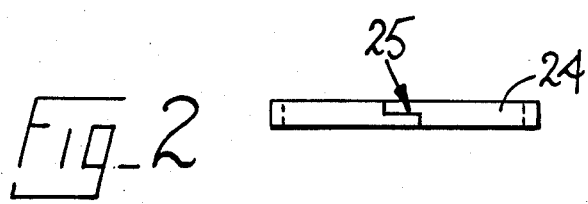
Fig_2

PLUNGER MECHANISM FOR USE IN A GLASSWARE FORMING MACHINE

BACKGROUND OF THE INVENTION

This invention is concerned with a plunger mechanism for use in a glassware forming machine, the mechanism being for use in moving a plunger into or out of a mould cavity of a mould of the machine. Such plunger mechanisms are used, for example, in glassware forming machines of the individual section type and also in other types of machine.

Glassware forming machines of the individual section type are well-known. These machines comprise a number of individual forming units, called "sections", which all receive gobs of molten glass from a common source and feed their output to a common conveyor. Each section comprises at least one parison-forming mould in which gobs of molten glass are formed into parisons and at least one blow mould in which the parisons are blown to the required shape. Parisons are formed in a mould cavity of a parison-forming mould of a machine of the individual section type either by a pressing operation or by a blowing operation.

A conventional plunger mechanism comprises a cylinder disposed below the parison mould, and a piston movable in the cylinder towards or away from the mould cavity upon the introduction of fluid under pressure into the cylinder. A piston rod projects from the piston towards the mould cavity and is arranged to carry a plunger so that movement of the piston causes movement of the plunger towards or away from the mould cavity. In a press-and-blow process in which the parison is formed by a pressing operation and the parison is subsequently blown, the piston is moved by air pressure to move the plunger into the mould cavity so that the plunger presses the glass to the shape of the cavity. Air under pressure is then used to move the plunger fully out of the mould cavity to allow the parison to be removed. Finally, the plunger is moved to an intermediate position, either by a spring compressed as the plunger was withdrawn from the cavity or by an auxiliary piston and cylinder assembly, and the next gob of molten glass is introduced into the mould cavity on top of the plunger. In a blow-and-blow process in which the parison is formed by the blowing operation and the parison is subsequently blown again, the plunger is directly mounted on the piston rod and is surrounded by a thimble which is spring urged towards the mould cavity. A further spring acts between the thimble and the piston rod. In operation, air pressure urges the plunger into the mould cavity into a load position in which a gob of molten glass is dropped on top of the plunger. The air pressure is then removed and the further spring aforementioned moves the plunger away from the mould cavity to a counter-blow position in which air can be blown past the plunger into the mould cavity to cause a parison to be formed therein. Air pressure is then used to pull the plunger and the thimble away from the mould cavity, compressing both springs. This brings the plunger to a position in which it is clear of the mould cavity so that the parison can be removed.

In the press-and-blow process, since the plunger of a plunger mechanism contacts molten glass, it requires cooling to prevent it from becoming so hot that it sticks to the glass and cannot be successfully withdrawn therefrom. Conventionally, this cooling is provided by cooling air which passes through a passage passing centrally through the piston and the piston rod, the passage being arranged to communicate with a chamber within the plunger so that the cooling air can pass into the chamber. A tube extends through the cylinder into the passage, the tube being fixed against movement with the piston and the piston rod. The tube is arranged to be connected to a source of air under pressure so as to supply cooling air to the passage. In the blow-and-blow process, this tube supplies the air for blowing a parison or is connected to a source of vacuum to suck air from the mould cavity. Since the tube passes through the piston, it is necessary that the gap between the wall of the passage be sealed to enable the piston to be moved effectively. This seal has to be able to operate over a long period of time and, because the cooling tube may be utilised to connect the mould cavity to a vacuum source when the parison is formed by a blowing operation, has to be able to resist damage from hot gases or glass particles passing along the passage. A conventional sealing means arranged to seal the gap between the exterior of the tube and the wall of the passage uses reinforced polytetrafluoroethylene rings which are v-shaped in transverse cross-section. For example, six rings are used with three facing in each direction and these rings are mainained in compression by means of a coil spring. This sealing means is expensive, is a source of considerable friction, and occupies a considerable space.

It is an object of the present invention to provide a plunger mechanism comprising sealing means which is less expensive, cause less friction, and is more compact than the above-mentioned conventional sealing means.

BRIEF SUMMARY OF THE INVENTION

The invention provides a plunger mechanism for use in a glassware forming machine, the mechanism being for use in moving a plunger into and out of a mould cavity of a mould of the machine, the plunger mechanism comprising a cylinder, a piston movable in the cylinder towards or away from the mould cavity upon the introduction of fluid under pressure into the cylinder, a piston rod projecting from the piston towards the mould cavity, the piston rod being arranged to carry a plunger so that movement of this piston causes movement of the plunger towards or away from the mould cavity, a passage passing centrally through the piston and the piston rod, the passage being arranged to communicate either with a chamber within the plunger or with the mould cavity, a tube extending through the cylinder and entering the passage, the tube being fixed against movement with the piston and piston rod and being arranged to be connected to a source of air under pressure or to a vacuum source, and sealing means arranged to seal the gap between the exterior of the tube and the wall of the passage, wherein the sealing means comprises an inwardly-contracting ring with an overlapping joint mounted in a recess in the piston or in a recess in a carrier member secured to the piston so that the ring makes sealing contact around the tube.

The sealing means of the plunger mechanism described in the last preceding paragraph uses simple commercially-available parts and hence is relatively inexpensive. It is also compact and is found to create less friction than a conventional sealing means.

In order to reduce the possibility of leakage through the recess past the inwardly-contracting ring, the sealing means may also comprise a ring of resilient material encircling the inwardly-contracting ring and sealing the gap between the inwardly-contracting ring and the wall of the recess.

In order to provide greater security against leakage, the sealing means may comprise a further inwardly-contracting ring with an overlapping joint mounted in a further recess in the piston or in a recess in a carrier member secured to the piston, which is spaced longitudinally of the tube from the first-mentioned recess, so that the further ring also makes sealing contact around the tube. A ring of resilient material may encircle the further inwardly-contracting ring and seal the gap between the further inwardly-contracting ring and the wall of the further recess.

BRIEF DESCRIPTION OF THE DRAWINGS

There now follows a detailed description, to be read with reference to the accompanying drawings, of a plunger mechanism which is illustrative of the invention. It is to be understood that the illustrative plunger mechanism has been selected for description by way of example and not of limitation of the invention.

In the drawings:

FIG. 1 is a vertical cross-sectional view taken through sealing means of the illustrative plunger mechanism; and FIG. 2 is a detail view of an inwardly-contracting ring of the illustrative plunger mechanism.

DETAILED DESCRIPTION OF PREFERRED EMBODIMENT OF THE INVENTION

The illustrative plunger mechanism is for use in a glassware forming machine of the individual section type and is generally similar, except as far as its sealing means is concerned, to the plunger mechanism described in U.S. Pat. No. 4,272,273. The mechanism is for use in moving a plunger (not shown) into a mould cavity of a mould (not shown) of the machine to press molten glass contained in the cavity to the shape of the cavity.

The illustrative plunger mechanism comprises a cylinder 10 which has a central axis extending towards the mould cavity, and a piston 12 movable in the cylinder 10 towards (upwardly viewing the drawing) or away from the mould cavity upon the introduction of fluid, viz. air, under pressure into the cylinder 10 either below or above the piston 12. The piston 12 has two peripheral recesses 14 which contain sealing rings 16 to seal the gap between the cylinder 10 and the piston 12.

The illustrative plunger mechanism also comprises a piston rod 18 projecting from the piston 12 towards the mould cavity. An upper end portion of the piston rod 18 (not shown) is arranged to carry a plunger so that movement of the piston 12 causes movement of the plunger towards or away from the mould cavity. A passage 20 passes centrally through the piston 12 and the piston rod 18 and is arranged to communicate with a chamber within a plunger mounted on the piston rod so that cooling air can be supplied to the chamber through the passage 20. Alternatively, when a blowing operation is being carried out, the passage can be arranged to communicate with the mould cavity so that air can be removed from beneath glass contained in the cavity.

The illustrative plunger mechanism also comprises a tube 22 extending through the cylinder 10 and entering the passage 20. The tube 22 is fixed against movement with the piston 12 and piston rod 18 and is arranged to be connected, through a lower end cap of the cylinder 10, to a source of air under pressure so that air can be supplied through the tube 22 to the passage 20, or, alternativey, to a vacuum source so that air can be sucked from the passage 20 through the tube 22.

The illustrative plunger mechanism also comprises sealing means arranged to seal the gap between the exterior of the tube 22 and the wall of the passage 20. The sealing means comprises an inwardly-contracting ring 24 with an overlapping joint 25, i.e. the joint (FIG. 2) is stepped. The ring 24 is made of standard piston ring quality gray iron is mounted in an annular recess 26 of a carrier member 28 which is received in a downwardly-opening recess 30 in the piston 12 which extends around the tube 22. The ring 24 makes sealing contact around the tube 22 and a ring of resilient material, provided by an O-ring 32, seals the gap between the ring 24 and the wall of the recess 26.

The carrier member 28 engages an upper surface of the recess 30 and an O-ring 34 seals the gap between the carrier member 28 and the wall of the recess 30. The recess 30 also contains a further carrier member 38 which defines a further annular recess 40 in which a further inwardly-contracting ring 42 with an overlapping joint is mounted. The ring 42 also makes sealing contact around the tube 22. A further O-ring 44 seals the gap between the ring 42 and the wall of the recess 40 which O-ring 46 seals the gap between the carrier member 38 and the wall of the recess 30. The carrier members 28 and 38 are spaced from one another by a spacing ring 48 contained in the recess 30 and are held in the recess 30 by a retaining ring 50 which secures them to the piston 12.

It is found that the sealing means of the illustrative plunger mechanism creates less than one third of the friction created by a conventional sealing means.

In some circumstances, it is possible to dispense with the O-rings 34 and 46 without undue leakage occurring.

We claim:

1. A plunger mechanism for use in a glassware forming machine, the mechanism being for use in moving a plunger into and out of a mould cavity of a mould of the machine, the plunger mechanism comprising a cylinder, a piston movable in the cylinder towards or away from the mould cavity upon the introduction of fluid under pressure into the cylinder, a piston rod projecting from the piston towards the mould cavity, the piston rod being arranged to carry a plunger so that movement of the piston causes movement of the plunger towards or away from the mould cavity, a passage passing centrally through the piston and the piston rod, the passage being arranged to communicate either with a chamber within the plunger or with the mould cavity, a tube extending through the cylinder and entering the passage, the tube being fixed against movement with the piston and piston rod and being arranged to be connected to a source of air under pressure or to a vacuum source, and sealing means arranged to seal the gap between the exterior of the tube and the wall of the passage, wherein the sealing means comprises an inwardly contracting ring with an overlapping joint mounted in a recess in the piston or in a recess in a carrier member secured to the piston so that the ring makes sealing contact around the tube, and a ring of resilient material encircling the inwardly-contracting ring and sealing the gap between the inwardly-contracting ring and the wall of the recess.

2. A plunger mechanism according to claim 1, wherein the sealing means comprises a further inwardly-contracting ring with an overlapping joint mounted in a further recess in the piston or in a recess in a carrier member secured to the piston, which is spaced longitudinally of the tube from the first-mentioned recess, so that the further ring also makes sealing contact around the tube, and a ring of resilient material encircling the further inwardly-contracting ring and sealing the gap between the further inwardly-contracting ring and the wall of the further recess.

3. A plunger mechanism for use in a glassware forming machine, the mechanism being for use in moving a plunger into and out of a mould cavity of a mould of the machine, the plunger mechanism comprising a cylinder, a piston movable in the cylinder towards or away from the mould cavity upon the introduction of fluid under pressure into the cylinder, a piston rod projecting from the piston towards the mould cavity, the piston rod being arranged to carry a plunger so that movement of the piston causes movement of the plunger towards or away from the mould cavity, a passage passing centrally through the piston and the piston rod, a tube extending through the cylinder and entering the passage, the tube being fixed against movement with the piston and piston rod, a downwardly extending recess in said piston extending about said tube, a carrier member mounted in said recess with said tube extending through said carrier member, and sealing means between said carrier member and said tube, said sealing means comprising an inwardly-contracting ring with an overlapping joint mounted in a recess in the said carrier member so that the ring makes sealing contact around the tube and a ring of resilient material encircling the inwardly-contracting ring and sealing the gap between the inwardly-contracting ring and the wall of the recess in said carrier member.

4. A plunger mechanism according to claim 3 further including a second carrier member mounted in said recess in said piston with said tube extending through said carrier member and second sealing means between said second carrier member and said tube, said second sealing means comprising a second inwardly-contracting ring with an overlapping joint mounted in a recess in the second carrier member so that the further ring makes sealing contact around the tube, and a ring of resilient material encircling the second inwardly-contracting ring and sealing the gap between the second inwardly-contracting ring and the wall of the recess in the second carrier member.

* * * * *